Patented Nov. 21, 1933

1,935,696

UNITED STATES PATENT OFFICE 1,935,696

CYANINE DYES AND PROCESS OF PREPARING THEM

Leslie G. S. Brooker, Rochester, N. Y., assignor to Eastman Kodak Company, Rochester, N. Y., a corporation of New York No Drawing. Original application March 12, 1930, Serial No. 435,105. Divided and this application February 20, 1932. Serial No. 594,382

19 Claims. (Cl. 260—41)

This invention relates to a new composition of matter, and particularly to a new class of photographic sensitizing dyes, namely, thio-iso-cyanines and thio-pseudo-cyanines, and methods for their preparation.

This application is a division of my application Serial No. 435,105, filed March 12, 1930, in which I have described the instant dyes and the naphthalene substituted cyanine dyes of the thiocarbocyanine series and a method for their preparation. Attention is also called to my application Serial No. 437,017 having a filing date of March 19, 1930 in which I have described the incorporation of these cyanines into photographic emulsions. These dyes are particularly well adapted for incorporation in photographic emulsions in order to render those emulsions more sensitive to particular portions of the spectrum. It has been known for some time, in the photographic art, that in order to render photographic emulsions sensitive to substantially all the visible rays of the spectrum, it is necessary to treat the emulsions, either by overcoating or by admixture with the emulsion itself, with a compound which extends the sensitivity of the emulsion beyond its natural sensitivity. An untreated emulsion will generally record only the short waves such as the blue and violet. By the proper use of a suitable dye, this restricted sensitivity can be varied at will, within certain limits. For example, the emulsion can be rendered strongly sensitive to green or blue or to any of the other visible bands of the spectrum, or it can be rendered sensitive to all the visible rays in substantially equal degrees.

An object of this invention is to provide a process for the preparation of certain cyanine dyes which may be incorporated in, or coated upon, photographic gelatino-silver-halide emulsions in order to increase their color sensitivity. A further object of this invention is to describe various methods for the preparation of such dyes. Other objects will hereinafter appear.

I have found that certain cyanine dyes, such as the thio-iso-cyanines and the thio-pseudo-cyanines, which are also called the thio-ψ-cyanines, and others which may be included under the broad classification of the thio-iso and thio-pseudo-cyanine dyes described above, may be prepared from the intermediates mu-methyl-naphthothiazoles. These dyes, when prepared in the manner described herein, together with the substitution products of these dyes are especially useful for addition directly to the gelatino-silver-halide or other photographic emulsions which may subsequently be coated on plates, films or other materials. Furthermore, these dyes are useful as overcoatings for photographic light sensitive surfaces, thereby increasing the light sensitivity of those surfaces.

I will now explain a method for the production of this particular class of dyes, but it will be understood that I am not to be restricted by the definite proportions or exact ingredients therein given except as they may be so indicated by the claims appended hereto. It will likewise be understood that the chemical structural formulæ employed herein are theoretical and are given so that those skilled in the art may more readily understand the composition of these dyes. Whether or not the chemical structure given is correct will in no way limit the scope of this invention as the methods for the preparation of the dyes, together with the suggested equivalents that may be used in such preparations will enable the skilled organic chemist to prepare these dyes, whatever their theoretical structural formulae may be. The structural formulæ given, however, are believed to be correct according to present knowledge.

*Example 1.*—In the preparation of 1:2-diethyl-5:6-benzo-thio-iso-cyanine iodide, one member of the series, I first prepare from beta-naphthylamine the intermediate 1-methyl alpha naphthothiazole by well known academic methods. This intermediate has the following structural formula:

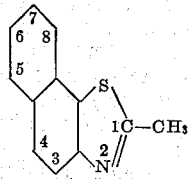

The isomeric 2 methyl beta naphthothiazole has the following structure:

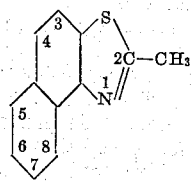

The reaction may be conducted in two steps.

*Step A*—One molecular proportion of 1-methyl alpha naphthathiazole is condensed with one molecular proportion of ethyl-p-toluene sulfonate by heating the substances together at 100° C. for approximately six hours.

*Step B*—The resulting crude product, which comprises substantially 1-methyl-alpha-naphthothiazole etho-p-toluene sulfonate is condensed with one molecular proportion of quinoline ethiodide using one molecular proportion of potassium hydroxide, the reaction being carried out in boiling absolute ethyl alcohol. This mixture is refluxed 15 minutes. Upon cooling, the dye separates and may be recrystallized from methyl alcohol. The resulting dye obtained consists of scarlet needles which impart to a methyl alcohol solution a crimson red coloration.

The several reactions involved in the foregoing are believed to be as follows:

The dye may be made from this intermediate in one step: 9.5 parts of 2-methyl-β-naphthothiazole ethiodide and 11 parts of 2-iodo-quinoline ethiodide are suspended in 63 parts of absolute ethyl alcohol. To this suspension are added with constant vigorous shaking 3.6 parts of potassium hydroxide (of about 85% purity) in absolute ethyl alcohol, the alkali being added to the boiling alcoholic suspension gradually during a period of from 5 to 10 minutes. Boiling is con-

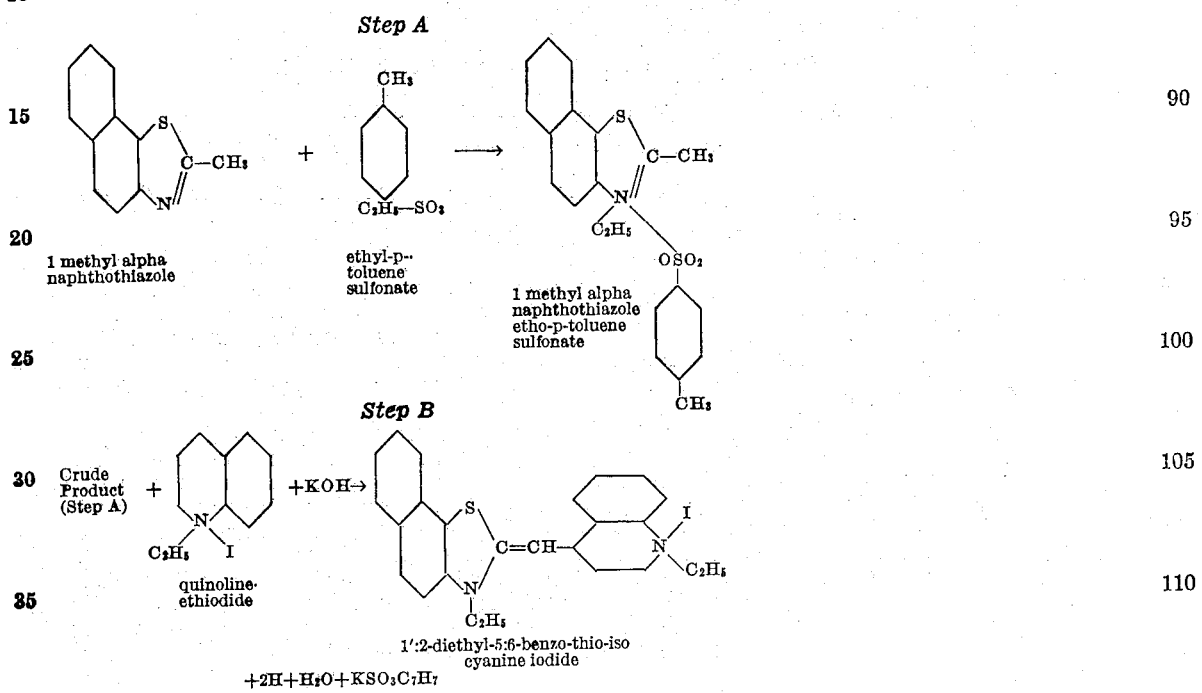

*Example 2.*—If an equivalent amount of 2-methyl-beta-naphthothiazole ethiodide be used in place of the 1-methyl-alpha-naphthothiazole etho-p-toluene sulfonate used in Example 1, a product will be obtained consisting of brown needles with a brassy green reflux. This dye will give a crimson solution in methyl alcohol. This may be called 1':2-diethyl-3:4-benzothio-iso-cyanine iodide.

*Example 3.*—In the preparation of 1': 2-diethyl-3: 4-benzo-thio-pseudo-cyanine iodide, another member of the series, I first prepare a 2-methyl-beta-naphthothiazole ethiodide by the following method:

Equimolecular proportions of 2-methyl-β-naphthothiazole and of ethyl-p-toluene sulfonate are heated together in an oil bath for a week at 130–140° C. When this salt is to be used it is purified by extracting the unchanged starting materials with acetone, in which the 2-methyl-β-naphthothiazole etho-p-toluene sulfonate is sparingly soluble. This salt may be converted into the iodide by double decomposition in fairly concentrated aqueous solutions with potassium iodide, whereby 2-methyl - β - naphthothiazole ethiodide is obtained. This substance is washed and dried at an elevated temperature, and has the following composition:

tinued for a period of 15 minutes after all the alkali has been added. The dye is filtered from the cooled solution and is purified by washing with boiling water and then with cold water followed by acetone. If the above example be conducted by using parts by weight in the c. g. s. system a yield of approximately 8.9 grams of unrecrystallized dye will be produced. This is purified by crystallization from methyl alcohol and is obtained in light brown plates and gives to a methyl alcohol solution a pinkish orange coloration.

The several reactions involved in the above example are believed to be as follows:

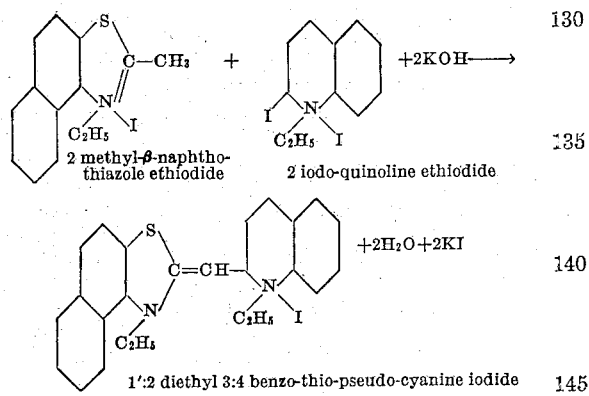

*Example 4.*—If in the above reaction (Example 3) a 1-methyl-alpha-naphthothiazole ethiodide is used in place of the 2-methyl-β-naphthothiazole ethiodide there is obtained a 1': 2-diethyl-5: 6-benzothio-pseudo-cyanine iodide. This dye crystallizes in light brown crystals which, on solution in methyl alcohol, give to that solution a pinkish orange coloration.

The nomenclature and the numbering of these compounds is entirely arbitrary but the system herein employed is according to current usage. A thio-iso-cyanine dye derived from 1-methyl-alpha-naphthothiazole, for instance, will have the following structure:

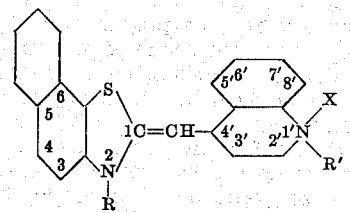

and will be called a 1':2-dialkyl-5:6-benzo thio-iso-cyanine salt. A dye similarly derived from the 2-methyl-β-naphthothiazole will have the following structure:

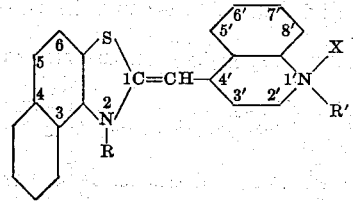

and in accordance with the numbering system used with the above dye, dyes of this class will be called 1':2-dialkyl-3:4-benzo-thio-iso-cyanine salt.

A thio-pseudo-cyanine dye derived from 1-methyl-alpha-naphthothiazole alkyl quaternary salt, for instance, will have the following structure:

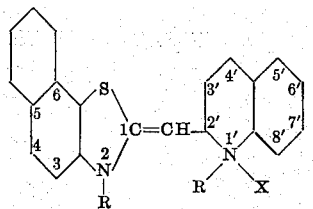

and will be called a 1':2-dialkyl-5:6-benzo-thio-pseudo-cyanine salt.

A thio-pseudo-cyanine dye derived from 2-methyl-β-naphthothiazole alkyl quaternary salt will have the following structure:

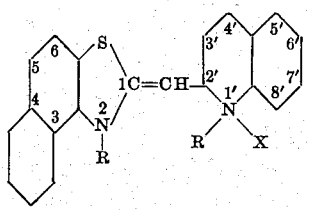

and in accordance with the numbering system used will be a 1':2-dialkyl-3:4-benzo-thio-pseudo cyanine salt.

It will be noted that of the two intermediates specifically disclosed, one is called the 2-methyl-beta and the other the 1-methyl-alpha naphthothiazole. This nomenclature, while it appears somewhat inconsistent, is that in current usage and results from a numbering of the rings counter clockwise for the 2-methyl-beta and clockwise for the 1-methyl-alpha naphthothiazole when the structures of the bases are drawn as shown. Instead of calling them 1-methyl or 2-methyl, the intermediate carbon atom to which the methyl group is attached being the same in either case, this position is sometimes called the mu position. When mu appears herein, therefore, it will refer to this intermediate carbon atom.

By a substitution in the above major structural formulæ of similar or dissimilar alkyl radicals in the R positions many sensitizing dyes may be obtained. The X indicates any suitable acid radical such, for example, as the halides, p-toluenesulfonate, alkylo sulfate or, in fact, any suitable acid radical which will not greatly decrease or destroy the sensitizing properties of the dye, this radical being necessary to give electrical neutrality to the molecule. In the claims the phrase —"A suitable acid radical"—is employed to designate this group of acid radicals. Furthermore, the use of fused-on substituted benzene nuclei or substituted or unsubstituted naphthalene nuclei or similar groupings in the 3:4 or 5:6 position will come within the scope of this invention as will also dyes containing substituents in the quinoline nucleus. For instance where the fused-on benzene ring is in the 3:4 position in the dye the 5 and/or 6 positions may be occupied by suitable substituent groups. This is achieved by starting with a methyl naphthothiazole in which substitution in the appropriate position has already been carried out.

It is apparent from the above description that any of the thio-iso or thio-pseudo cyanines in which substituted or unsubstituted benzene rings are fused on to the benzo thiazole nucleus of the parent thio-iso or thio-pseudo cyanine molecule in the 3:4 or the 5:6 position and dyes of this type containing similar or dissimilar alkyl groups, and in which various suitable acid radicals are attached to one of the nitrogen atoms in the molecule, will come within the scope of this invention. The quinoline nucleus of these dyes may likewise be substituted or unsubstituted.

From a consideration of the above numerous examples for preparing various photo sensitizing dyes from mu methyl naphthothiazoles as intermediates, it will be readily realized that the 1-methyl-alpha or the 2-methyl-beta naphthothiazole which may be generally called mu methyl naphthothiazoles may be used in the preparation of numerous types of photo sensitizing dyes. It will be realized, therefore, that after preparing the alkyl quaternary salt such as the methiodide or ethiodide or the etho-p-toluenesulfonate from the mu-methyl naphthothiazole, the particular dye it is desired to obtain may be produced by condensing the aforementioned quaternary salt with a quaternary salt derived from quinoline in boiling ethyl alcohol in the presence of a caustic alkali. To avoid confusion it may be stated that in this application an excess of one reagent or another may be indicated or employed; this, however, does not alter the reaction as stated broadly above and elsewhere in this application.

It will be readily realized from a study of this application, together with my co-pending applications on various classes of photo sensitizing dyes that numerous substituted quinolines may be employed as well as the substituted mu methyl naphthothiazoles without departing from the scope of this invention or sacrificing any of the beneficial results obtained from the dyes when used as photo sensitizers or for other purposes.

What I claim is:

1. A process for the preparation of cyanine dyes which comprises condensing a mu-methyl-naphthothiazole quaternary salt with a quinolinium quaternary salt in the presence of an alkali and an inert organic solvent for the reactants.

2. A process for the preparation of cyanine dyes which comprises condensing a mu-methyl-naphthothiazole alkyl quaternary salt with a quinolinium quaternary salt in the presence of an alkali and an inert organic solvent for the reactants.

3. A process for the preparation of cyanine dyes which comprises condensing a mu-methyl-naphthothiazole alkyl quaternary salt with quinoline ethiodide in the presence of an alkali and an inert organic solvent for the reactants.

4. A process for the preparation of cyanine dyes which comprises condensing a mu-methyl-naphthothiazole alkyl quaternary salt with 2-iodo quinoline ethiodide in the presence of an alkali and an inert organic solvent for the reactants.

5. A process for the preparation of cyanine dyes which comprises condensing a mu-methyl-naphthothiazole etho-p-toluenesulfonate with quinoline ethiodide in the presence of an alkali and an inert organic solvent for the reactants.

6. A process for the preparation of cyanine dyes which comprises condensing a mu-methyl-naphthothiazole etho-p-toluenesulfonate with 2-iodo quinoline ethiodide in the presence of an alkali and an inert organic solvent for the reactants.

7. A process for the preparation of cyanine dyes which comprises condensing a mu-methyl-naphthothiazole quaternary salt with a quinolinium quaternary salt in the presence of alcoholic caustic alkali.

8. A process for the preparation of cyanine dyes which comprises condensing a mu-methyl-naphthothiazole alkyl quaternary salt with a quinolinium quaternary salt in the presence of alcoholic caustic alkali.

9. A process for the preparation of cyanine dyes which comprises condensing a mu-methyl-naphthothiazole alkyl quaternary salt with quinoline ethodide in the presence of alcoholic caustic alkali.

10. A process for the preparation of cyanine dyes which comprises condensing a mu-methyl-naphthothiazole alkyl quaternary salt with 2-iodo quinoline ethiodide in the presence of alcoholic caustic alkali.

11. A process for the preparation of cyanine dyes which comprises condensing a mu-methyl-naphthothiazole etho-p-toluenesulfonate with quinoline ethiodide in the presence of alcoholic caustic potash.

12. A process for the preparation of cyanine dyes which comprises condensing a mu-methyl-naphthothiazole etho-p-toluenesulfonate with 2-iodo quinoline ethiodide in the presence of alcoholic caustic potash.

13. A 1': 2-dialkyl-3: 4-benzo-thio-pseudo-cyanine salt.

14. A 1': 2 dialkyl-benzo-thio-pseudo cyanine salt.

15. A 1': 2-diethyl-3: 4-benzo-thio-pseudo-cyanine salt.

16. A 1':2-dialkyl-3: 4-benzo-thio-iso-cyanine salt.

17. A 1': 2-dialkyl-benzo-thio-iso-cyanine salt.

18. A 1': 2-diethyl-3: 4-benzo-thio-iso-cyanine salt.

19. A cyanine dye of the following structure—

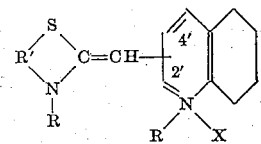

in which R is an alkyl group, R' is a naphthylene group and X is an acid radical, the quinoline nucleus being linked through either the 2' or 4' position.

LESLIE G. S. BROOKER.